(12) United States Patent
Gaertner et al.

(10) Patent No.: US 10,192,576 B1
(45) Date of Patent: Jan. 29, 2019

(54) METHOD AND APPARATUS THAT MODIFIES SEEKS TO REMEDIATE INTER-ACTUATOR COUPLING IN A STORAGE DRIVE

(71) Applicant: Seagate Technology LLC, Cupertino, CA (US)

(72) Inventors: Mark Allen Gaertner, Vadnais Heights, MN (US); Evgeny Kharisov, Chaska, MN (US); Josiah Natan Wernow, St. Paul, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/831,919

(22) Filed: Dec. 5, 2017

(51) Int. Cl.
| | | |
|---|---|---|
| *G11B 5/55* | (2006.01) | |
| *G11B 27/36* | (2006.01) | |
| *G11B 5/48* | (2006.01) | |
| *G06F 3/06* | (2006.01) | |
| *G11B 5/54* | (2006.01) | |

(52) U.S. Cl.
CPC .......... *G11B 5/5547* (2013.01); *G06F 3/0676* (2013.01); *G11B 5/4813* (2013.01); *G11B 5/5578* (2013.01); *G11B 27/36* (2013.01); *G06F 3/0659* (2013.01); *G11B 5/54* (2013.01)

(58) Field of Classification Search
None
See application file for complete search history.

(56) References Cited

U.S. PATENT DOCUMENTS

| | | | | |
|---|---|---|---|---|
| 5,261,058 A | * | 11/1993 | Squires | G06F 3/0601 360/78.12 |
| 5,355,486 A | | 10/1994 | Cornaby | |
| 5,610,808 A | * | 3/1997 | Squires | G06F 3/0601 360/78.12 |
| 6,560,075 B2 | | 5/2003 | Price et al. | |
| 6,847,504 B1 | | 1/2005 | Bennett et al. | |
| 7,315,429 B2 | * | 1/2008 | van Zyl | G11B 5/4806 360/61 |
| 7,760,463 B2 | * | 7/2010 | Ward | G11B 21/025 360/78.12 |
| 9,401,165 B1 | * | 7/2016 | Tian | G11B 5/54 |
| 9,911,442 B1 | * | 3/2018 | Kharisov | G11B 5/5547 |
| 9,928,861 B1 | * | 3/2018 | Erden | G11B 5/5586 |
| 10,049,691 B1 | * | 8/2018 | Gaertner | G11B 5/5578 |
| 2008/0123213 A1 | | 5/2008 | Craig et al. | |

* cited by examiner

Primary Examiner — Tan X Dinh
(74) Attorney, Agent, or Firm — Hollingsworth Davis, LLC (57) ABSTRACT

A faulty tracking condition affecting a first head driven by a first actuator of a hard disk drive is determined. The faulty tracking condition is caused by a second actuator of the hard disk drive that is moving while the first actuator is performing a tracking operation. Responsive to the determination of the faulty tracking condition, seek forces of the second actuator that cause the faulty tracking condition affecting the first head are reduced. A controller verifies that similar faulty tracking conditions are reduced with the first head in response to the reduction in seek forces.

16 Claims, 6 Drawing Sheets

METHOD AND APPARATUS THAT MODIFIES SEEKS TO REMEDIATE INTER-ACTUATOR COUPLING IN A STORAGE DRIVE

SUMMARY

The present disclosure is directed to a method and apparatus that modifies seeks to remediate inter-actuator coupling in a storage drive. In one embodiment, a faulty tracking condition affecting a first head driven by a first actuator of a hard disk drive is determined. The faulty tracking condition is caused by a second actuator of the hard disk drive that is moving while the first actuator is performing a tracking operation. Responsive to the determination of the faulty tracking condition, seek forces of the second actuator that cause the faulty tracking condition affecting the first head are reduced. A controller verifies that similar faulty tracking conditions are reduced with the first head in response to the reduction in seek forces.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to improve HDD performance measures such as TOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests. In some embodiments, using two heads simultaneously involves operating two actuators (e.g., voice coil motors) at the same time as well.

The simultaneous seek capability of a multiple actuator disk drive is not without technical implementation challenges. There are various different mechanical approaches to multiple actuators, such as two actuators collocated on a common pivot axis, or two actuators located apart (e.g., opposed) on different pivots. Regardless of which mechanical approach is taken, seek performance can be affected by the mechanical interactions between actuators. When an actuator is accelerated and decelerated, it imparts equal and opposite forces on the drive enclosure. These forces are felt by the other actuators in the system and are compensated for during their tracking and seeking by a servo control system.

The greatest forces intentionally exerted during normal operation are during seek acceleration and deceleration of the actuators. These forces are most likely to impact the ability to track settle and track follow on the other actuator(s). The largest impact to performance is caused when settle and follow operations during writing are disturbed. The settle/follow constraints are tighter during writing so as not to accidently overwrite adjacent track data. If these operations are disturbed too much, then the write operation will be delayed or suspended resulting in degraded performance.

In embodiments described below, a controller is configured to reduce forces induced by seeks of one actuator when the other actuator(s) are either observing a high rate of late seeks and/or write faults and/or is in a state that is very susceptible to increased disturbances. This allows adjusting performance during drive operation such that the performance of one actuator can be reduced (e.g., less aggressive seeks) in order to improve the performance of another actuator (e.g., reduce delayed or missed writes).

Figure 1:
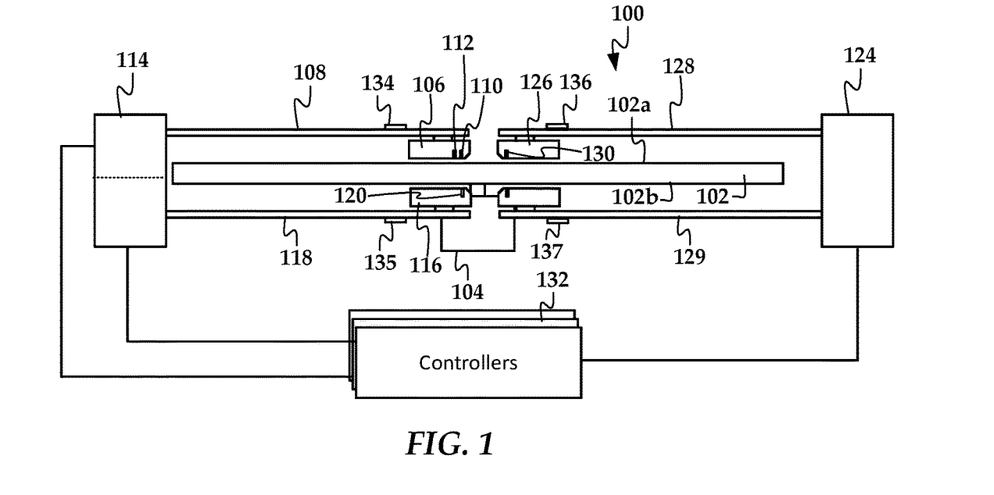
FIG. 1 is a block diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A head 106 (also referred to as a read/write head, read head, write head, recording head, etc.) is held over a first surface 102a of the disk 102 by an arm 108. An actuator 114 moves (e.g., rotates) the arm 108 to place the head 106 over different tracks on the disk 102. The actuator 114 may include a voice coil motor (VCM) that rotates in response to an electrical current, although embodiments described herein may be applicable to other tracking actuators, e.g., linear actuators, microactuators, etc.

In one embodiment, the head includes a read transducer 110 and/or a write transducer 112. The read transducer 110 provides a signal in response to changing magnetic fields on the disk 102, and is coupled to a controller 132, where the separate read signals are independently processed. The write transducer 112 receives signals from the controller 132 and converts them to magnetic fields that change magnetic orientations of regions on the disk 102.

The apparatus 100 includes a second head 116 supported by a second arm 118. The second head 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split VCM actuator). In either configuration, the arms 108, 118 rotate around the same axis. The head 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third head 126 supported by a third arm 128. The third head 126 (and its associated actuation hardware) may be included instead of or in addition to the second head 116. The third head 126 is held over the first surface 102a of the disk 102 as a second actuator 124 causes the third arm 118 to move to different tracks on the disk 102. The arm 128 and actuator 124 move independently of arm 108 and actuator 114. The head 126 includes read and/or write transducers 130. The transducers 130 are capable of reading from and/or writing to disk surface 102*a* simultaneously with transducers 110, 112 of first head 106. The second actuator 124 may optionally include another arm that accesses second surface 102*b* of the disk 102.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102*a*, 102*b* at the same time. Independently movable heads that utilize non-coaxial actuators 114, 124 may access the same surface at the same time, e.g., heads 106 and 126 may both access surface 102*a* at the same time, as well as accessing different surfaces at the same time. The arms 108, 118, 128, 129 may also include microactuators 134-137 that control fine movements of the heads. The microactuators 134-137 may include motive elements such piezoelectric strips that undergo small deformations in response to an applied electrical current.

One or more controllers 132 are coupled to the respective actuators 114, 124 and control movement of the actuators 114, 124 and microactuators 134-137. The controllers 132 may include one or more ASICs or systems-on-a-chip (SoCs) that perform parallel operations such as servo control, encoding and decoding of data written to and read from the disk 102, queuing and formatting host commands, etc. Where two or more ASICs or SoCs are used, the ASICs/SoCs may have identical hardware (e.g., formed from the same semiconductor die pattern), although may be configured to perform differently, e.g., due to different firmware and/or software instructions that are executed at start up.

In any of the mechanical approaches illustrated in FIG. 1, one effect of having independently operating actuators are the interactions between actuators. When an actuator is accelerated and decelerated, it imparts equal and opposite forces on the drive structure. These forces are felt by the other actuators in the system. If not compensated for during tracking and seeking, these reaction forces can reduce performance of the other actuators, e.g., increase settling times, cause mistracking, result in undershooting or overshooting a target track, etc.

Figure 2:
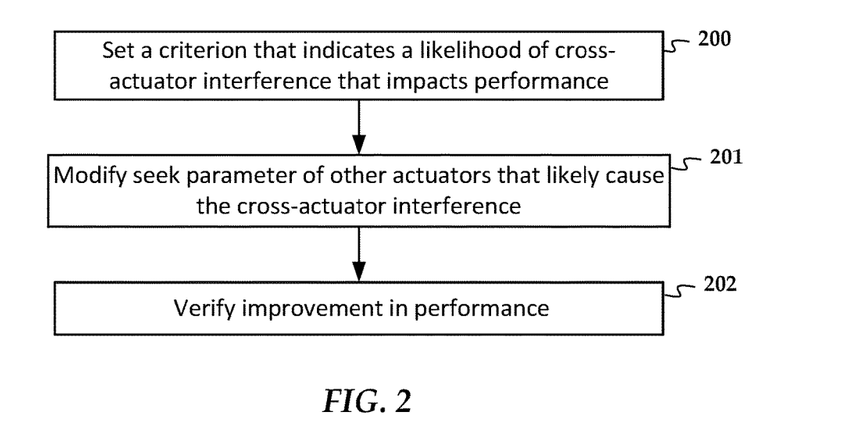
FIG. 2 is a flowchart of a method according to an example embodiment.

In FIG. 2, a flowchart illustrates a high-level procedure for mitigating inter-actuator interference according to an example embodiment. A criterion is set 200 that indicates a likelihood of cross-actuator interference that impacts performance. In response to the criterion being met, a seek parameter (e.g., acceleration or deceleration current, types and timing of seek operations) of another actuator that likely caused the cross-actuator interference is modified 201. After the modification 201, the affected actuator is monitored to verify 202 improvement due to the modification 201. This verification 202 can be immediate, e.g., in a closed-loop controller which measures changes right after changing the seek parameter, or over long-term use, e.g., in an open-loop controller that makes occasional adjustments responsive to long-term trends.

A number criteria can be used separately or in combination to determine that the seek forces should be reduced by one or more of the actuators as shown in block 200 of FIG. 2. A number of these criteria are shown in the block diagram of FIG. 3. As shown in blocks 300 and 301, one criteria which may be applicable to both read and/or write operations of the affected head is a percentage of seeks completing past expected position, e.g., greater than a predetermined threshold value, e.g., fixed value or one that can vary over time. Blocks 302 and 303 indicate criteria that are also applicable to reads and writes of the affected head, and relate to percent seeks completing past expected position greater than an average value plus an offset. The offset may be constant or variable (e.g., changes as the drive ages). For blocks 300-303, accumulated excess time (actual minus expected) may be monitored instead of percentage of seeks past target position. This accumulated time value may be used, either alone or divided by the total number of seeks.

Figure 3:
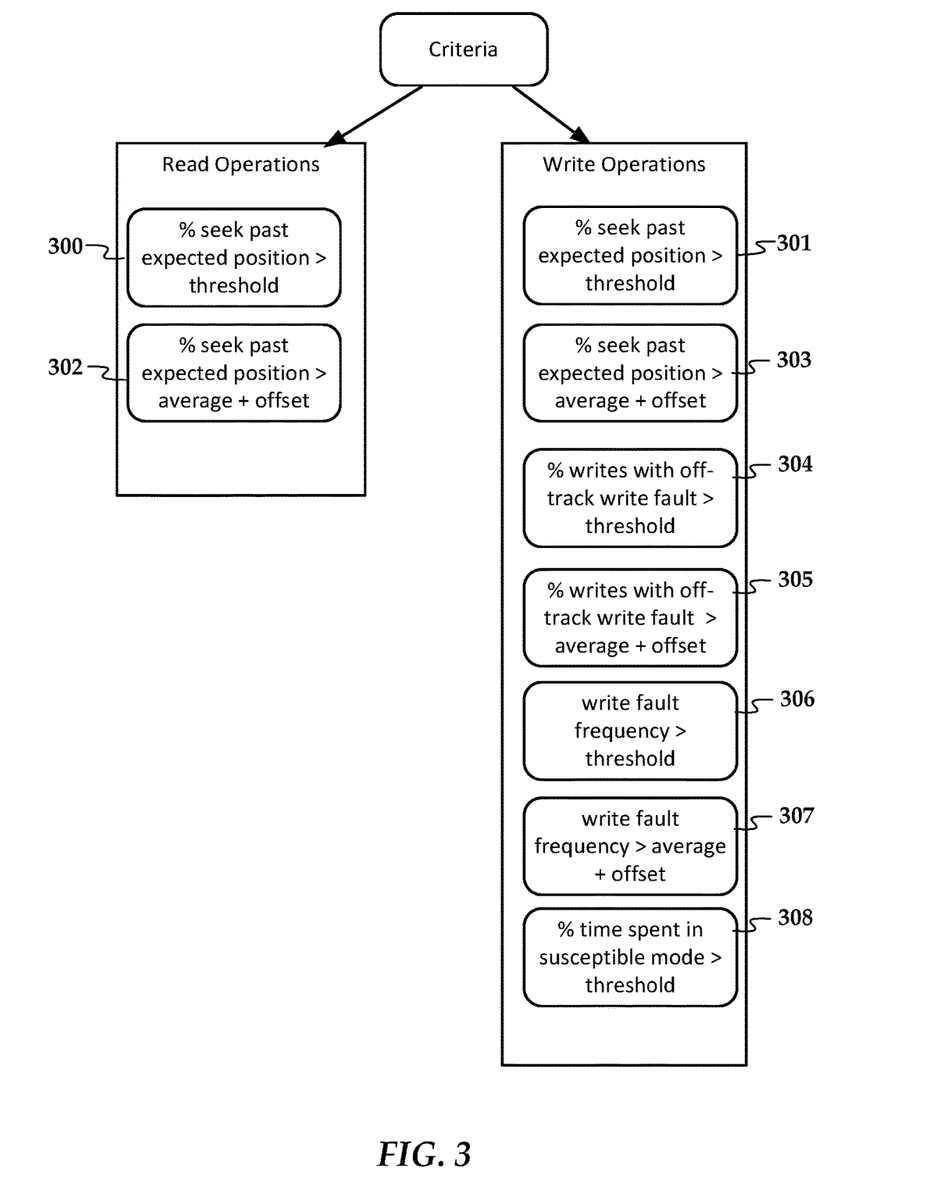
FIG. 3 is a block diagram of faulty tracking condition criteria according to an example embodiment.

Blocks 304-308 represent write-only criteria to determine disturbances of an affected head from the seeking of another actuator. The criterion in block 304 is percent writes by the affected head that encounter an off-track write fault that are greater than a predetermined fixed or variable threshold value. The criterion in block 305 is percent writes of the affected head encountering an off-track write fault that are greater than an average value plus an offset (e.g., constant or variable offset). The criterion in block 306 is write fault frequency of the affected head being greater than a fixed or variable threshold value. Generally write fault frequency refers to the ratio of write faults to total number of write operations. The criterion in block 307 is write fault frequency being greater than an average value plus a constant or variable offset. The criterion in block 308 is percent of recent time the affected head spends in susceptible mode (e.g., write settling and/or write track following) greater than a fixed or variable threshold value.

Note that any of the criteria 300-308 may be combined to form a composite criterion of susceptibility to disturbance from another actuator. The criteria may be expanded, e.g., applying some criteria 304-308 to read operations. The susceptibility may vary for different modes of operation (e.g., read, write) thus combining them may involve weighting of each term. Note that the threshold values and offsets described above may change over time, e.g., due to expected or measured changes in device operation due to wear. Such thresholds and offsets may be also or instead dynamic values that change based upon operating conditions, such as operational vibration, temperature, humidity, drive orientation, power saving modes, etc.

Figure 4:
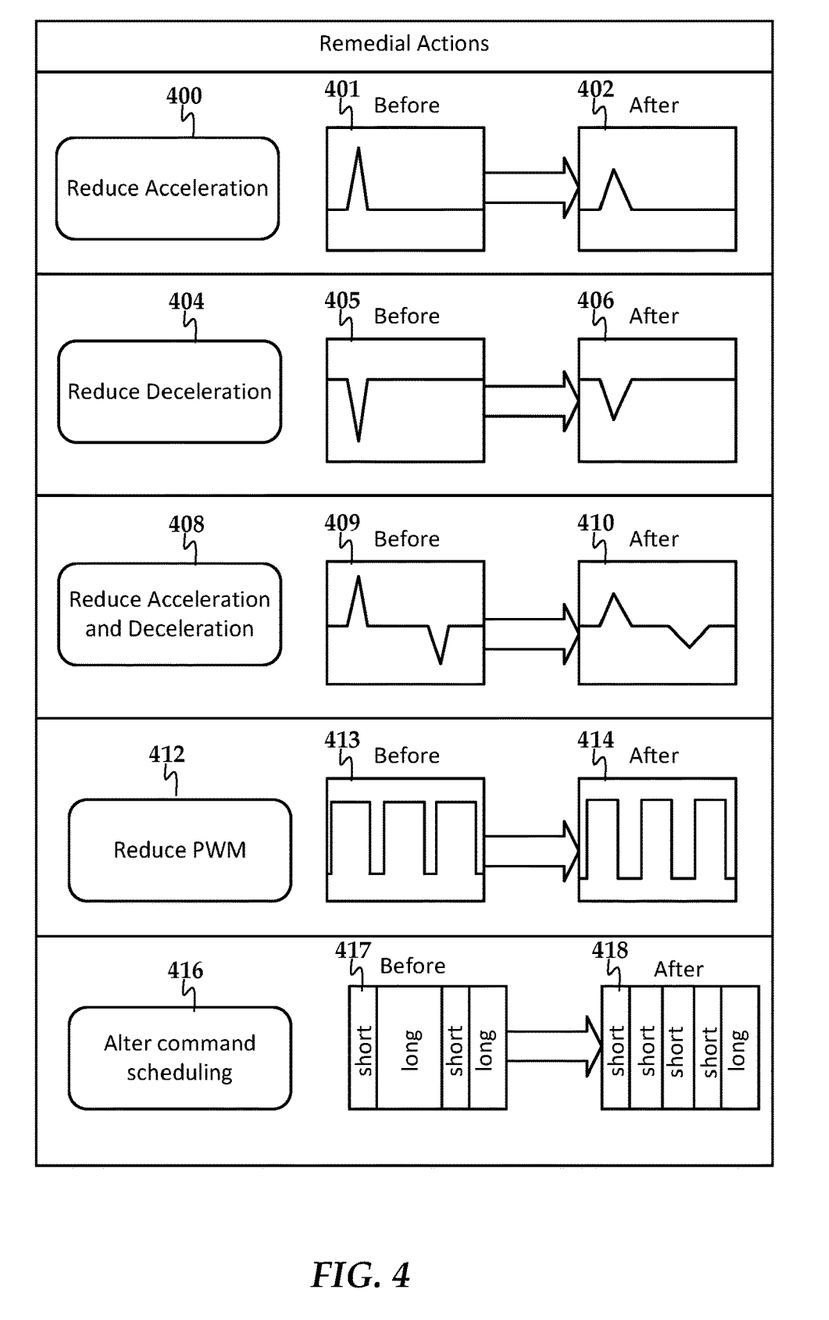
FIG. 4 is a block diagram showing remedial actions to reduce seek force disturbances according to an example embodiment.

Generally, once a criteria or combination thereof indicate possibility or likelihood of a significant inter-actuator disturbance, seek forces of at least the actuator suspected of causing the disturbances are reduced. In FIG. 4, a block diagram shows a number of techniques that may be used to reduce inter-actuator interference according to example embodiments. These techniques are generally described as remedial actions, in that they are intended to reduce negative impacts on other actuators and heads in the storage device. The remedial actions may be made in any combination, and may be applied short- or long-term to ongoing drive operations.

As indicated by block 400, one remedial action involves reducing the seek acceleration forces of the disturbance-causing actuator. For example, the maximum allowable acceleration of the actuator may be reduced. As seen in blocks 401 and 402, which represent acceleration curves versus time before and after remediation, the peak acceleration is reduced, although the time spent accelerating may increase, and other factors may be adjusted, e.g., time to start accelerating may be earlier. This can reduce seek forces induced by acceleration while minimizing impacts to seek time.

As indicated by block 404, another remedial action involves reducing the deceleration forces of the disturbance-causing actuator. For example, the maximum allowable acceleration of the actuator may be reduced. As seen in blocks 405 and 405, which represent deceleration curves versus time before and after remediation, the peak deceleration is reduced, although the time spent decelerating may increase, and other factors may be adjusted, e.g., time to start decelerating may be earlier. This can reduce seek forces induced by deceleration while minimizing impacts to seek time.

As indicated by block 408, another remedial action involves reducing both the acceleration and deceleration forces of the disturbance-causing actuator. For example, the maximum allowable acceleration of the actuator may be reduced. As seen in blocks 409 and 410, which represent acceleration curves versus time before and after remediation, the peak acceleration and deceleration is reduced, although the time spent accelerating and decelerating may increase. Other factors may be adjusted, e.g., time to start accelerating/decelerating may be earlier. Note that the reduction may be asymmetric, e.g., the acceleration is reduced more or in a different way than the acceleration or vice versa.

The changes to acceleration and/or deceleration may generally involve reshaping the seek current profiles in a manner that reduces seek forces while minimizing the impact to seek times. As shown in block 412, the reduction of pulse width seek currents, as seen in blocks 413, 414, can be used to reduce accelerations and decelerations. As shown in block 416, another way to reduce actuator forces is to alter the command scheduling policy to favor commands that induce less seek forces. As seen in blocks 417 and 418, for example, the change in scheduling results on more low-disturbance seeks and fewer high-disturbance seeks. Similarly, accesses with long latencies can be identified and scheduled appropriately allowing the servo system to slow seek acceleration/deceleration without further access-time penalty.

In order to compensate for inter-actuator coupling, a number of control mechanisms may be used. For example, an open-loop controller may be used that, upon detecting one or more criteria as shown in FIG. 3, reduces seek forces or performs other actions such as shown in FIG. 4. The amount of reduction may be scaled based on the magnitude or type of detection criteria. Upon detecting that criteria no longer exists, the device reverts to normal seek operation or modifying the scaling factor of the reduction. Detecting the criteria exists or no longer exists may involve some hysteresis and/or time lag. Using an open-loop control mechanism causes minimal interruption in the normal operation of the device, although may not be able to react as quickly as other control mechanisms.

Figure 5:
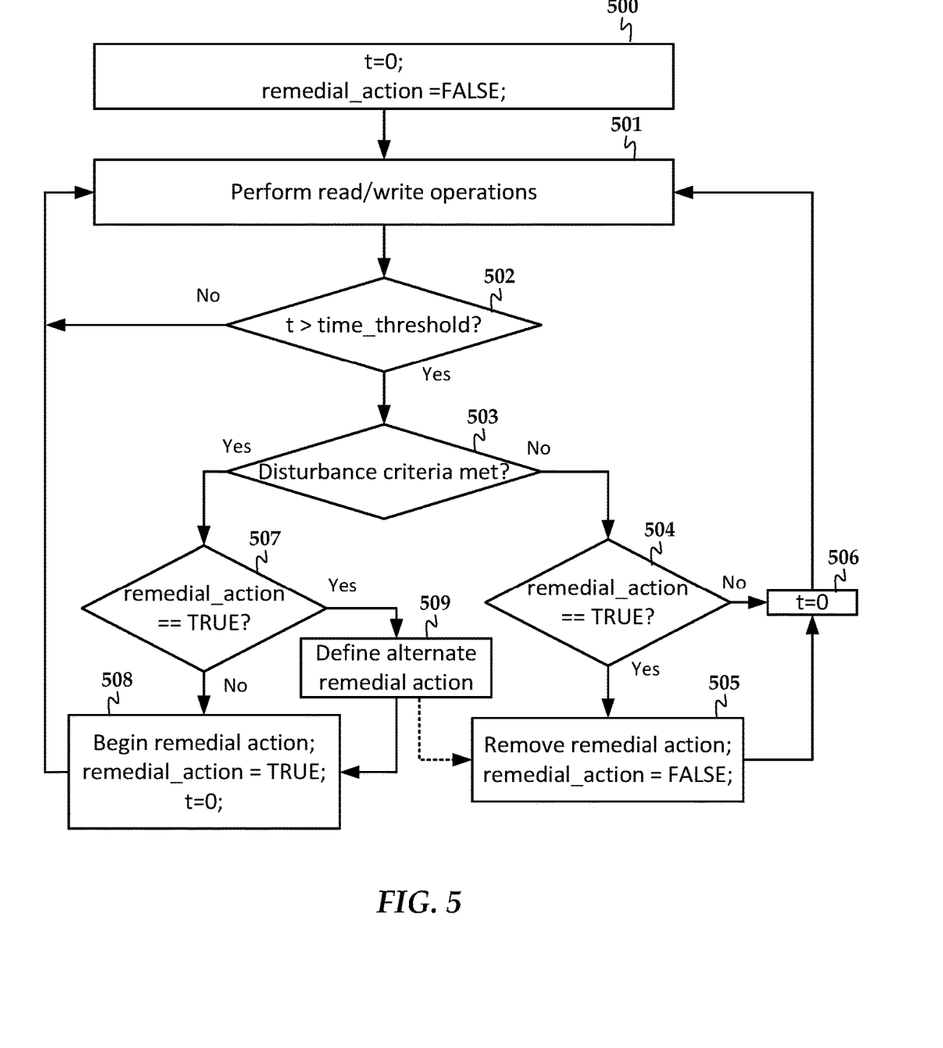
FIG. 5 is a flowchart showing an open-loop control procedure according to an example embodiment.

In FIG. 5, a flowchart shows an open-loop control procedure according to an example embodiment. This procedure may be performed for each target set of heads associated with a target actuator. In such a case, the disturbance criteria are associated with the target set of heads, and the remedial actions are associated with and performed on actuators other than the target actuator.

At block 500, time tracking and a remedial action state variable are initialized, and normal read/write operations are performed at block 501. The time tracking variable represents the value that tracks system and/or operational time, the timer being reset by setting the variable to zero. Block 502 checks the timer variable against a time threshold. Block 502 may be entered in response to a polling mechanism, timer interrupt, or other computing process/mechanism that relates to time, and/or may be triggered by a tracking error that is considered part of the performance criteria analyzed at block 503. Assuming the time variable meets or exceeds the threshold (block 502 returns 'yes'), a check is made to see if one or more performance criteria are met as seen in block 503 e.g., block 503 returns 'yes' if performance is negatively impacted. It may be assumed that during normal operations performed in block 501, tracking and other errors as shown in FIG. 3 are continually logged such that the criteria can be evaluated before or at the decision at block 503 occurs.

If the one or more disturbance criteria are not met (block 503 returns 'no'), a check at block 504 is made to see if a remedial action is currently being applied. If so, then the current remedial action is removed and the state variable reset as shown in block 505. Alternatively, instead of removing the remedial action, the remedial action may be altered. For example, if remedial actions are scaled (e.g., maximum acceleration reduced by a scaling factor n<1) so one possibility so to change the scaling (maximum acceleration reduced by a scaling factor m, where n<m<1). In either case, the timer is reset as shown in block 506. If the one or more disturbance criteria are met (block 503 returns 'yes'), a check at block 507 is made to see if a remedial action is currently being applied. If not (block 507 returns 'no'), then remedial action is begun, and the timer and remedial action state variables are reset as shown in block 508. The remedial action started at block 508 may include any combination of action shown in FIG. 4.

Note that if block 507 returns 'yes,' then the remedial action is currently being applied, but the disturbance is still affecting the target head(s) such that block 503 still returns 'yes.' This case is demonstrated by block 509, which shows one example of what can be done in this case. As shown in block 509, an alternate remedial action may be selected, and then treated the same as the previous remedial action via block 508. The alternate remedial action may be a different mechanism or combination of mechanisms (e.g., altering scheduling versus reducing acceleration and/or deceleration) and/or may involve scaling the currently used remediating mechanisms. As indicated by the dashed line from block 509, an alternate choice may be to remove or scale any existing remedial action, in which case control passed to block 505. In such a case, the existence of the disturbance may be logged, and other actions may be taken, e.g., sending an alert via drive status reporting mechanisms that communicate with the host.

Another control mechanism that may be used in a drive to effect the above-indicated remediation is closed-loop control. For example, upon detecting a disturbance criteria in a closed-loop controller, seek force reduction or other actions are performed. The amount of reduction may be scaled based on detection criteria. While in the state of reduced seek forces, the criteria is actively monitored. If insufficient improvement, allow seek forces to be increased or potentially reverting to normal seek operation. If improvement and detection criteria (possibly altered from original criteria to enter this mode) still indicates an issue, seek forces may be further reduced, or other actions may be performed (e.g., change schedule, send alert to host).

Figure 6:
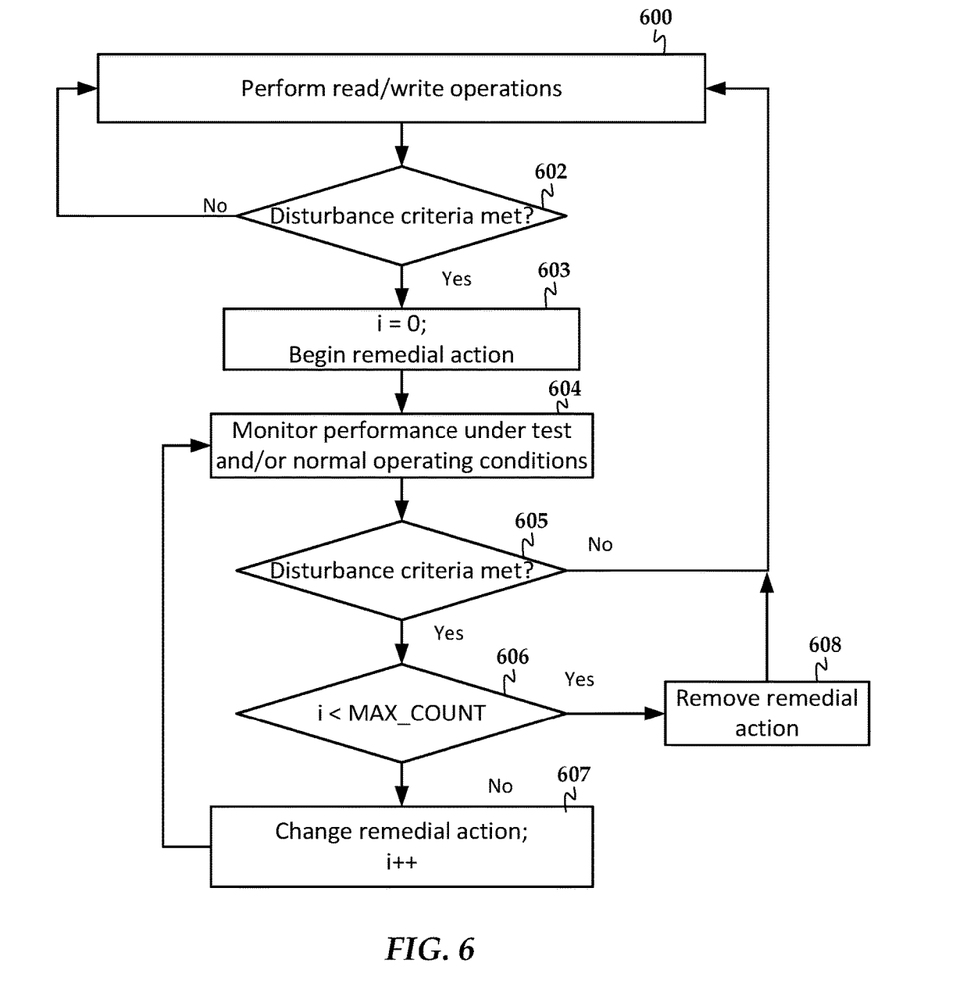
FIG. 6 is a flowchart showing a closed-loop control procedure according to an example embodiment.

In FIG. 6, a flowchart shows a closed-loop control procedure according to an example embodiment. As with the open-loop procedure shown in FIG. 5, the closed-loop procedure in FIG. 6 may be performed for each target set of heads associated with a target actuator. In such a case, the disturbance criteria are associated with the target set of heads, and the remedial actions are associated with and performed on actuators other than the target actuator.

Block 600 represents normal operation of the drive, e.g., reading and writing data to the recording medium. In response to a trigger or other mechanism monitored during this operation (e.g., read error, write error, etc.), a check is made as shown at block 602 to see if disturbance criteria is met. If so, then iteration through a loop begins at block 603 that attempts to reduce or eliminate the disturbance. At block 603, a loop counter variable is initialized and remedial action is begun, e.g., some combination of actions as shown in FIG. 4. The beginning of the loop is block 604.

At block 604, performance of the target head or heads are monitored under test conditions and/or normal operating conditions, e.g., executing a number of currently queued commands. In the latter case, the queued commands may be selected in an order designed to replicate the detected disturbance rather than the default queueing order. During this monitoring, disturbance criteria is tested as indicated at block 605. If the currently selected remediation is effective, then block 605 will return 'no' and normal operations can commence. If block 605 returns 'yes,' then the remediation was not successful. Before altering the remedial action at block 607, the counter is checked at block 606 to see if it exceeds a threshold times through the loop. In such a case, the remedial action may be removed as indicated at block 608, and normal operations commence. Note other actions may be performed at block 608, such as applying the most effective remediation action found in the loop even if it didn't meet the criteria. Error logging and reporting may also occur.

At block 607, the current remedial action is changed, and the loop counter is incremented. The changing of remedial action may involve using a different mechanism or combination of mechanisms (e.g., altering scheduling versus reducing acceleration and/or deceleration) and/or may involve scaling the currently used remediating mechanisms. After the change, the performance is again immediately evaluated at block 604, and this continues until either the disturbance is sufficiently reduced via block 605 or the loop limit is met via block 606.

Figure 7:
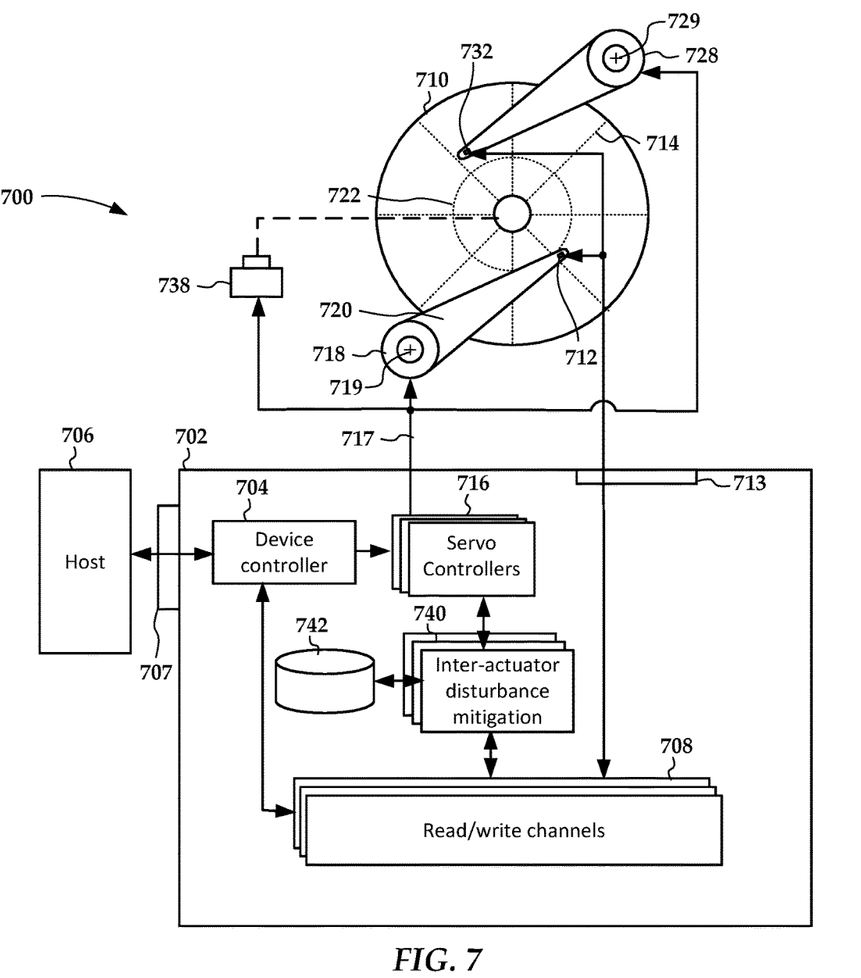
FIG. 7 is a block diagram of an apparatus according to an example embodiment.

In FIG. 7, a block diagram illustrates a data storage drive 700 that utilizes one or more actuators according to example embodiments. The apparatus includes circuitry 702 such as one or more device controllers 704 that process read and write commands and associated data from a host device 706 via a host interface 707. The host interface 707 includes circuitry that enables electronic communications via standard bus protocols (e.g., SATA, SAS, PCI, etc.). The host device 706 may include any electronic device that can be communicatively coupled to store and retrieve data from a data storage device, e.g., a computer, a server, a storage controller. The device controller 704 is coupled to one or more read/write channels 708 that read from and write to surfaces of one or more magnetic disks 710.

The read/write channels 708 generally convert data between the digital signals processed by the device controller 704 and the analog signals conducted through two or more heads 712, 732 during read operations. The two or more heads 712, 732 each may include respective read transducers capable of concurrently reading the disk 710, e.g., from the same surface or different surfaces. The two or more heads 712, 732 may also include respective write transducers that concurrently write to the disk 710. The write transducers may be configured to write using a heat-assisted magnetic recording energy source, and may write in various track configurations, such as conventional, shingled, and interlaced.

The read/write channels 708 may include analog and digital circuitry such as digital-to-analog converters, analog-to-digital converters, detectors, timing-recovery units, error correction units, etc. The read/write channels 708 coupled to the heads 712, 732 via interface circuitry 713 that may include preamplifiers, filters, etc. As shown in the figure, the read/write channels 708 are capable of concurrently processing one of a plurality of data streams from the multiple heads 712, 732.

In addition to processing user data, the read/write channels 708 read servo data from servo marks 714 on the magnetic disk 710 via the read/write heads 712, 732. The servo data are sent to one or more servo controllers 716 that use the data to provide position control signals 717 to one or more actuators, as represented by voice coil motors (VCMs) 718. The VCM 718 rotates an arm 720 upon which the read/write heads 712 are mounted in response to the control signals 717. The position control signals 717 may also be sent to microactuators (not shown) that individually control each of the heads 712, e.g., causing small displacements at each read/write head.

The VCM 718 may be a stacked or split actuator, in which case two VCM parts are configured to independently rotate different arms about a common axis 719. In such a case, other heads (not shown) will access data on the disks simultaneously with that of heads 712, and these other heads may be coupled to circuitry 702 similar to illustrated head 732. In other embodiments, a second actuator, e.g., VCM 728, may independently and simultaneously rotate a second arm 730 about a second axis 729. Corresponding heads 732 may be rotated by the VCM 728 and may operate simultaneously with the heads 712 under commands from the one or more servo controllers 716.

A disturbance mitigation module 740 is operable via the controller 704 and can access a data store 742. This data store 742 may include disturbance criteria and parameters of possible or currently implemented remedial actions as described above, or equivalents thereof. The disturbance mitigation module 740 may, for example, determine a faulty tracking condition affecting a first head 712 driven by a first actuator 718 of the hard disk drive 700. The faulty tracking condition of the affected head 712 is caused by a second actuator 728 of the hard disk drive 700 moving while the first actuator 718 is performing a tracking operation. Seek forces of the second actuator 728 are reduced after the faulty tracking condition. The module thereafter verifies (e.g., using closed-loop or open-loop control) that similar faulty tracking conditions are reduced or do not occur with the first head 712 responsive to the reduction in seek forces.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    determining a faulty tracking condition affecting a first head driven by a first actuator of a hard disk drive, the faulty tracking condition caused by a second actuator of the hard disk drive that is moving while the first actuator is performing a tracking operation:
    responsive to the determination of the faulty tracking condition, reducing seek forces of the second actuator that cause the faulty tracking condition affecting the first head; and
    verifying that similar faulty tracking conditions are reduced with the first head responsive to the reduction in seek forces.

2. The method of claim 1, wherein verifying that similar faulty tracking conditions are reduced with the first head comprises an open-loop control procedure that involves:
    returning to normal operation after reducing the seek forces; and
    determining, in response to a trigger, whether the similar faulty tracking conditions are reduced.

3. The method of claim 2, wherein the determining whether the similar faulty tracking condition occurs is further in response to an elapsed time since a previous similar determination occurred exceeds a time threshold.

4. The method of claim 1, wherein verifying that similar faulty tracking conditions are reduced with the first head comprises a closed-loop control procedure that involves:
    actively monitoring a test operation or normal operation after reducing the seek forces; and
    determining, in response the active monitoring, whether the similar faulty tracking condition occurs.

5. The method of claim 4, wherein the closed-loop control procedure further involves iteratively changing a remedial action that reduces the seek forces and determining whether the similar faulty tracking conditions are reduced in response to the change.

6. The method of claim 1, wherein reducing seek forces of the second actuator applied to the first actuator comprises rescheduling operations of the second actuator to mitigate the faulty tracking condition, the rescheduling reducing long seeks of the second actuator.

7. The method of claim 1, wherein reducing the seek forces comprises reducing one of an acceleration and deceleration of the second actuator during seeks by the second actuator.

8. The method of claim 1, wherein reducing the seek forces comprises reducing both of an acceleration and deceleration of the second actuator during seeks by the second actuator.

9. The method of claim 1, wherein the reduction of the seek forces is scaled based on at least one of a magnitude and a type of the faulty tracking condition.

10. The method of claim 1, wherein the determining of the faulty tracking condition comprises determining that an excessive number of seeks of the first actuator past an expected position have occurred.

11. The method of claim 1, wherein the determining of the faulty tracking condition comprises determining that an excessive number of off-track write faults have occurred.

12. The method of claim 1, wherein the determining of the faulty tracking condition comprises determining that an excessive time spent in susceptible mode by the first head has occurred.

13. The method of claim 1, wherein the determining of the faulty tracking condition comprises determining a weighted combination of number of off-track write faults, number of seeks of the first actuator past an expected position, and time spent in susceptible mode by the first head.

14. A data storage drive comprising:
    interface circuitry coupled to first and second actuators that drive respective first and second heads that read one or more disks; and
    a controller coupled to the interface circuitry and operable to:
        determine a faulty tracking condition affecting the first head caused by the second actuator moving while the first actuator is performing a tracking operation:
        responsive to the determination of the faulty tracking condition, reduce seek forces of the second actuator that cause the faulty tracking condition affecting the first head; and
        verify that similar faulty tracking conditions are reduced with the first head responsive to the reduction in seek forces of a hard disk drive, the faulty tracking condition caused by a second actuator.

15. The data storage drive of claim 14, wherein the determining of the faulty tracking condition comprises determining any combination of a number of off-track write faults, a number of seeks of the first actuator past an expected position, and a time spent in susceptible mode by the first head.

16. The data storage drive of claim 14, wherein reduction of the seek forces comprises any combination of rescheduling operations of the second actuator to reduce long seeks, reducing an acceleration and of the second actuator during seeks, and reducing a deceleration of the second actuator during the seeks.

* * * * *